Oct. 15, 1940.  F. H. EHNTS  2,217,739

ADJUSTABLE LUBRICATING FITTING

Filed July 30, 1938

INVENTOR
Fred Henry Ehnts
BY
Fraser, Myers & Manley
ATTORNEYS

Patented Oct. 15, 1940

2,217,739

UNITED STATES PATENT OFFICE 2,217,739

ADJUSTABLE LUBRICATING FITTING

Fred Henry Ehnts, Lansdowne, Pa., assignor to Keystone Lubricating Company, Philadelphia, Pa., a corporation of Pennsylvania Application July 30, 1938, Serial No. 222,102

10 Claims. (Cl. 184—105)

My present invention relates to a lubricating fitting and aims to provide certain improvements therein. More particularly, it relates to an adjustable tell-tale fitting for giving a visual indication when a ball or other bearing being lubricated with a viscous lubricant through such fitting has been supplied with an adequate amount of lubricant.

In the use of tell-tale lubricating fittings of the general type disclosed in my co-pending application, No. 203,011, filed April 20, 1938, various factors must be taken into consideration in order to obtain the desired tell-tale or indication that the bearing to which the fitting is attached has been supplied with the requisite amount of viscous lubricant. These factors are (1) the size of bearing to be lubricated; (2) the location of the fitting with respect to the bearing housing; (3) the length of the extension member where remote application of the lubricant to an inaccessible bearing is resorted to; (4) the character and size of the passages through which the lubricant must pass, etc.

The standard fitting shown in Figs. 1 to 3 of my aforementioned application is calibrated to provide for the proper lubrication of ball or roller bearings where the fitting is connected directly to the opening in the bearing housing and the housing clearance around the anti-friction member races is not large. Where extension members are employed my aforesaid application also discloses a type of fitting for insuring proper lubrication with different lengths of extension members. In these various forms of tell-tale fittings the pressure at which the viscous lubricant will back-up and exude from the tell-tale openings is governed by (1) the minimum cross-sectional area of the spacing between the supply tube and the wall of the back pressure chamber surrounding the supply tube and (2) by the skin or surface friction of the viscous lubricant in passing over the complemental walls of the tube and the chamber. Hence by controlling these factors the back-pressure of the lubricant can be governed.

It is accordingly the primary object of my invention to provide an adjustable fitting by means of which the back-pressure therethrough necessary for providing the tell-tale can be easily and accurately governed. A further object is to provide a tell-tale fitting which may be used with various characters of bearings and bearing housings as well as with extension members for such housings. A further object is to provide such fitting which can be adjusted to govern the back pressure necessary for the tell-tale while the fitting is in place on a bearing housing and the like. A still further object is to provide such fitting with indicia to indicate the character of the adjustment made or to be made in the fitting for any particular situation.

The foregoing and other objects not specifically enumerated I accomplish by forming the fitting of relatively adjustable axial parts to vary the cross-sectional area between the interior and exterior walls of the casing and the tubular element respectively and providing means for locking said parts in adjusted relation. Preferably the walls referred to are complementally tapered so that by varying the axial relationship between the parts the cross-sectional area therebetween will be varied.

The invention will be better understood from the detailed description which follows when considered in connection with the accompanying drawing which shows certain preferred embodiments, and wherein, Figure 1 is a side elevation of a fitting embodying my invention;

Figure 3:
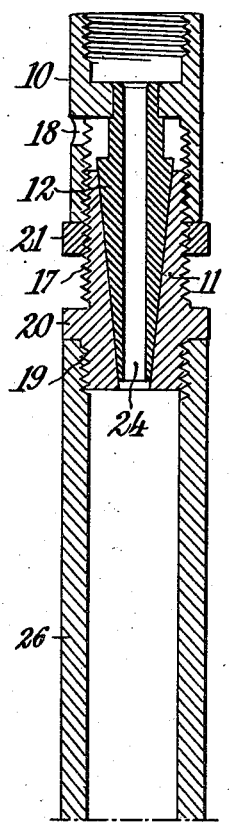
Fig. 3 is a view similar to Fig. 2 showing the fitting connected to an extension member of a bearing housing.
Figure 1:
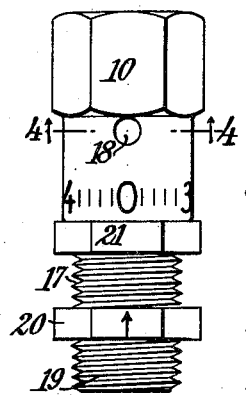

Referring first to Figs. 1 to 5 of the drawing, the adjustable fitting disclosed therein consists of a casing composed of two sections 10 and 11 and a central tubular element 12.

The casing section 10 is of general tubular form having an internal flange 13 intermediate its ends and to which one end of the tubular element 12 is secured by being either force fitted into the opening in said flange or by being snugly fitted through said opening and having the free end of the tubular element swaged or upset over the flange as indicated at 14. The internal wall of the casing section 10 above the flange 13 is internally screw-threaded, as indicated at 15, to accommodate any form or type of supplemental fitting for engagement by a grease gun or other source of viscous lubricant supply means. The internal wall of the casing section below the flange 13 is also screw-threaded as indicated at 16 for engagement with the external screw-threads 17 on the inner casing section 11. Formed in the wall of the casing section 10 below the flange 13 so as to establish open communication between the bore of the screw threaded portion 16 and the exterior of the casing are a plurality of lateral openings 18. Preferably the casing section 10 at its outer end is externally of polygonal shape to provide wrench-engaging surfaces.

The inner section 11 is also of general tubular form and at its lowermost or free end is externally threaded as indicated at 19 for engagement with a bearing housing or other member for receiving the lubricant on its discharge from the fitting. For securing the fitting to the housing or the like, the casing section 11, in spaced relation to the screw-threaded end 19, is formed with a polygonal wrench-engaging portion 20. Engaging over the screw-threaded portion 17 is a nut 21 the function for which will presently appear. The casing section 11 has a conical bore 22 of complemental taper to the exterior surface 23 of the tubular element 12.

The tubular element 12 being fixedly carried by the casing section 10, it will be appreciated that as the casing section 11 is screw-threaded into the casing section 10 that the cross-sectional area of the space between the conical walls 22 and 23 in a plane perpendicular to the axis of the members will vary from a maximum when the sections are first brought into engagement, to a minimum of zero when the walls come into contact with each other. The area of opening between the conical walls 22 and 23 will govern the back-pressure at which viscous lubricant which is charged through the central bore 24 of the tubular element will, after being charged into a bearing housing 25, or tubular extension member 26, back up between said complemental walls and exude out through the openings 18.

The size of the bearing to be lubricated, the location of the fitting with respect to the bearing housing, the length of the extension member where remote application of lubricant to the bearing housing must be resorted to, the character and size of the passages through which the lubricant must pass, etc., are all factors which govern the amount of lubricant which will be charged into a bearing housing under a definite area of opening between the walls 22 and 23. Hence, where any of these factors vary it becomes necessary to vary the area of the cross-sectional area between the walls which, as aforestated, is accomplished by relative adjustment of the casing section 11 with respect to the casing section 10. When a desired adjustment is obtained, to hold this adjustment against variation the lock nut 21 is tightened up into engagement with the end of the casing section 10 to hold the parts in definitely fixed relation. Furthermore, to provide a definite indication as to the adjustment between the casing sections 10 and 11 for any given bearing or extension member to be lubricated, the outer wall of the casing section 10 is provided with indicia corresponding to the degree of a complete turn of one of the casing sections with respect to the other.

Figure 2:
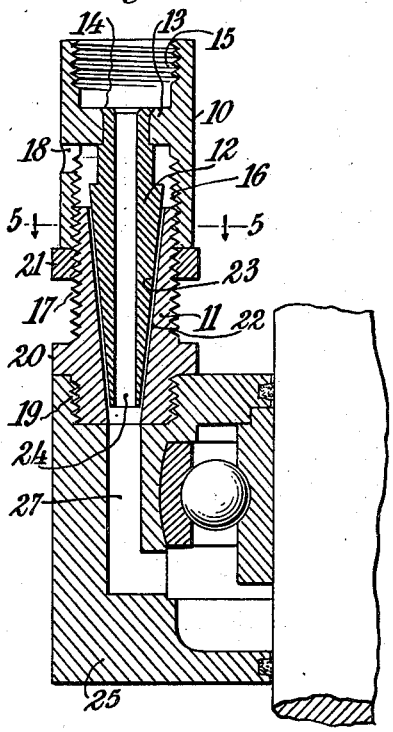
Fig. 2 is an axial section through the fitting shown in Fig. 1 connected to a bearing housing which is also shown in section.
Figure 4:
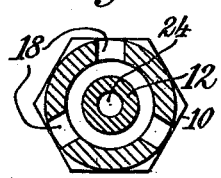
Fig. 4 is a section taken along the plane of the line 4—4 of Fig. 1.

In Fig. 2 the fittings is shown as applied to a bearing housing 25 having an angular lubricant receiving duct 27, which introduces additional resistance to the movement of the lubricant being charged into the housing and in view of which it will be appreciated that in order to insure a proper supply of lubricant to the casing, the back pressure necessary to provide the proper tell-tale will be greater than where no obstruction to the passage of lubricant is encountered. In other words, where obstructions to the passage of lubricant are encountered the cross-sectional area of the space between the complemental walls 22 and 23 will be less than where the lubricant is charged without obstruction directly into a bearing housing.

In Fig. 3 I have shown the fitting as attached to an extension member 26 connected to a bearing housing 28. To obtain a tell-tale when lubricating a bearing housing from a point remote from the housing, for example through an extension member such as 26, it has been determined by applicant that the resistance to the backing up of lubricant through the fitting will be progressively greater in longer extension members, hence by varying the cross-sectional area of opening between the complemental walls 22 and 23, the fitting may be adjusted to provide a tell-tale when applied to any length of extension member.

Figure 6:
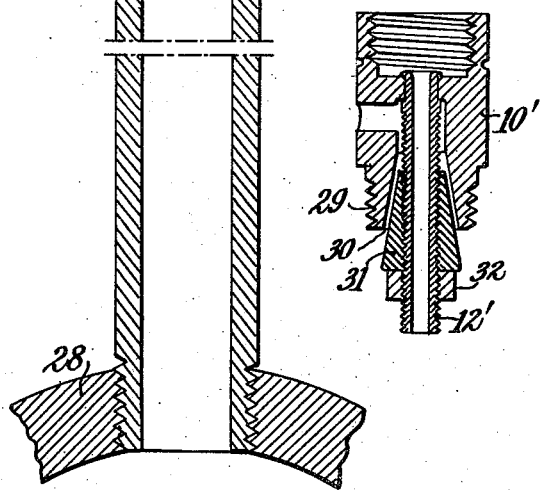
Fig. 6 is an axial section through a modified form of the invention.
Figure 5:
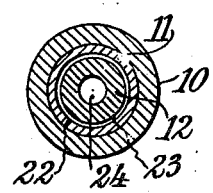
Fig. 5 is a section taken along the plane of the line 5—5 of Fig. 2.

In Fig. 6 I have shown a modified form of construction of fitting in which in lieu of the casing being formed of two adjustable sections, the casing is formed as a single member and the tubular element is provided with an adjustable member. In this modification the casing 10' at its inner end is externally screw-threaded, as indicated at 29 for connection of the fitting with a part to be lubricated, and the bore of the fitting at its inner end is of conical form as indicated at 30. The tubular element is fixedly carried by the casing 10' as in the first form described, and is externally screw-threaded and carries a nut 31 having an outer wall which is complementally tapered to the bore 30 for relative adjustment with respect thereto. Said tubular element 12' also carries a lock-nut 32 for holding the nut 31 in any adjusted position on the tubular element. In the modification shown in Figs. 1 to 5 it will be appreciated that adjustment of the fitting can be made either prior to or after the fitting is attached to the part to be lubricated. The fitting of Fig. 6, however, must be adjusted prior to its attachment to the part to be lubricated.

From the foregoing detailed description it will be appreciated that I have provided an adjustable fitting which is adapted for general use, since with the one fitting a desired tell-tale can be obtained when the fittng is attached to different typs of lubricant-receiving members by varying the cross-sectional area of opening in the fitting and thereby insure a tell-tale when the desired amount of lubricant has been charged into the member. The forms of the invention described are considered to be preferred embodiments but it is to be understood that I do not wish to be limited to the precise constructions disclosed since it will be apparent that changes therein may be made within the range of engineering skill, without departing from the spirit of my invention.

What I claim is:

1. A fitting of the character described, comprising a tubular casing having means for attachment to a member for receiving viscous lubricant, a tubular element within the casing having one end adapted for connection with a source of viscous lubricant and the other end adapted to discharge said lubricant into the member to which the casing is adapted for connection, the casing and the tubular element having normally spaced apart interior and exterior walls respectively, providing a chamber, means for varying the effective area of opening leading from the lubricant receiving member to the chamber, means for locking the parts in any relation to which they have been adjusted and the casing having an opening through its wall leading from the chamber within the casing provided by the spaced walls to the exterior of the casing.

2. A fitting of the character described, comprising a tubular casing having means for attachment to a member for receiving viscous lubricant, a tubular element within the casing having one end adapted for connection with a source of viscous lubricant and the other end adapted to discharge said lubricant into the member to which the casing is adapted for connection, the casing and the tubular element having normally spaced apart interior and exterior walls respectively, providing a chamber, means for varying the effective area of opening between said walls, means for locking the parts in any relation to which they have been adjusted and the casing having an opening through its wall leading from the chamber within the casing provided by the spaced walls to the exterior of the casing.

3. A fitting according to claim 1 wherein the interior and exterior walls of the casing and the tubular element respectively have complementally tapered portions.

4. A fitting according to claim 1 wherein the tubular element is fixedly carried by the casing and the casing consists of two axially adjustable sections.

5. A fitting according to claim 1 wherein the tubular element is fixedly carried by the casing and the casing consists of two axially adjustable sections, the one which is movable relatively to the tubular element having the means thereon for attachment to a member for receiving viscous lubricant.

6. A fitting according to claim 1 wherein the tubular element is fixedly carried by the casing which consists of two screw-threadedly connected sections and means thereon for locking the sections in any desired axial relation.

7. A fitting according to claim 1 wherein the tubular element is fixedly carried by the casing which consists of two screw-threadedly connected sections and means thereon for locking the sections in any desired axial relation, the section which is movable relatively to the tubular element having the means thereon for attachment to a member for receiving viscous lubricant.

8. A fitting according to claim 1 wherein the tubular element is fixedly carried by the casing which consists of two screw-threadedly connected sections, the section which is movable relatively to the tubular element being screw-threaded at both ends and a lock nut on said movable section for abutting the other section to lock the sections in any desired axial relation.

9. A fitting according to claim 1 wherein the tubular element is fixedly carried by the casing and has an axially adjustable section thereon which has an exterior wall adapted to be brought in adjustable spaced relation to the interior wall on the casing for varying the effective area of opening therebetween.

10. A fitting according to claim 1 wherein the tubular element is fixedly carried by the casing and has an axially adjustable section thereon which has an exterior wall adapted to be brought in adjustable spaced relation to the interior wall on the casing for varying the effective area of opening therebetween, and said tubular element having the means thereon for locking the parts in any relation to which they have been adjusted.

FRED HENRY EHNTS.